United States Patent [19]

Yang

[11] Patent Number: 5,711,182

[45] Date of Patent: Jan. 27, 1998

[54] CRIMPING TOOL WITH WIRE STRIPPING CAPABILITY

[76] Inventor: Shyi-Dong Yang, No.356, Peng-I Rd., Tai-Ping Hsiang, Tai-Chung Hsien, Taiwan

[21] Appl. No.: 709,601

[22] Filed: Sep. 9, 1996

[51] Int. Cl.[6] .................................................. H01R 43/05

[52] U.S. Cl. ........................ 72/409.14; 72/324; 30/90.1; 7/107; 7/130

[58] Field of Search ................................ 72/409.14, 324; 29/564.4; 30/90.1; 7/107, 130, 131; 81/9.44; 83/947

[56] References Cited

U.S. PATENT DOCUMENTS

| | | | |
|---|---|---|---|
| 3,312,988 | 4/1967 | Shannon | 7/107 |
| 3,654,647 | 4/1972 | Neff | 7/131 |
| 3,710,406 | 1/1973 | Stanford | 7/130 |
| 3,733,627 | 5/1973 | Epstein | 140/102.5 |
| 3,871,078 | 3/1975 | Ogle | 30/90.1 |

*Primary Examiner*—Daniel C. Crane
*Attorney, Agent, or Firm*—Oblon, Spivak, McClelland, Maier & Neustadt, P.C.

[57] ABSTRACT

A crimping tool includes first and second elongated members, each of which has a front jaw portion, a middle pivot portion and a rear handle portion. The crimping tool further includes a fastener which extends through the pivot portions to mount pivotally the first and second elongated members to each other in such a manner that the first and second elongated members are movable pivotally towards each other from an open position to a closed position. The rear handle portion of each of the first and second elongated members has an inner longitudinal edge formed with a wire stripping section and a lobe member. The lobe members of the first and second elongated members cooperatively prevent movement of the first and second elongated members away from each other in a direction parallel to an axis of the fastener when the first and second elongated members are operated such that the wire stripping sections of the first and second elongated members cooperatively strip an insulation layer of an electrical wire.

1 Claim, 9 Drawing Sheets

CRIMPING TOOL WITH WIRE STRIPPING CAPABILITY

BACKGROUND OF THE INVENTION

1. Field of the Invention

The present invention relates to a crimping tool with a wire stripping capability, more particularly to a crimping tool which is provided with lobe members to achieve a torsion-resistant effect, which is safe to use and which results in a high working efficiency.

2. Description of the Related Art

FIGS. 1 and 2 illustrate a conventional crimping tool 10 which has a wire stripping capability. The crimping tool 10 includes a first elongated member 11 and a second elongated member 12, each of which has a front jaw portion, a middle pivot portion and a rear handle portion. A pivot member 101 extends through the middle pivot portions of the elongated members 11, 12 to mount pivotally the latter to each other in such a manner that the elongated members 11, 12 are movable pivotally towards each other from an open position in which the elongated members 11, 12 form a generally X-shaped structure, and in which the front jaw portions and the rear handle portions of the elongated members 11, 12 are spaced apart from each other, to a closed position in which the front jaw portions and the rear handle portions of the elongated members 11, 12 are adjacent to each other. The front jaw portion of each of the elongated members 11, 12 has an inner longitudinal edge formed with a wire cutting section 13 and a first wire crimping section 14. The middle pivot portion of each of the elongated members 11, 12 is formed with a plurality of screw cutting holes 15 of different dimensions. The screw cutting holes 15 of the first elongated member 11 are respectively registered with the screw cutting holes 15 of the second elongated member 12 when the elongated members 11, 12 are moved to the open position. A screw (not shown) that is extended through selected registered ones of the screw cutting holes 15 is thereby cut when the elongated members 11, 12 are subsequently operated to move to the closed position. The rear handle portion of each of the elongated members 11, 12 has an inner longitudinal edge formed with a second wire crimping section 16 and a wire stripping section 17. The wire stripping sections 17 of the elongated members 11, 12 cooperatively confine recesses 171 of different dimensions for stripping the insulation layer of different sizes of electrical wires. The rear handle portion of each of the elongated members 11, 12 is further provided with a pair of grip members 19.

Although the conventional crimping tool 10 is capable of accomplishing many tasks, such as cutting screws, crimping terminals of conductors, and stripping the insulation layer of an electrical wire, the crimping tool 10 has the following drawback. Referring to FIGS. 1 to 3, when an electrical wire 20 is placed in a selected one of the recesses 171 of the wire stripping sections 17, and the handles 19 are pressed together to cut the insulation layer 21 of the wire 20, the stripping sections 17 of the elongated members 11, 12 are liable to move away from each other in a direction parallel to an axis of the pivot member 101. As shown in FIG. 3, the insulation layer 21, therefore, cannot be completely stripped and residual bits 211 are left on the stripped electrical wire 20. The work quality and efficiency are adversely affected.

SUMMARY OF THE INVENTION

The main object of the present invention is to provide a crimping tool with a wire stripping capability.

A second object of the present invention is to provide a torsion-resistant crimping tool which is safe to use and which increases the working efficiency.

Accordingly, the crimping tool of the present invention includes a first elongated member and a second elongated member, each of which has a front jaw portion, a middle pivot portion and a rear handle portion. The crimping tool further includes a fastener which extends through the middle pivot portions to pivotally mount the first and second elongated members to each other in such a manner that the first and second elongated members are movable pivotally towards each other from an open position in which the first and second elongated members form a generally X-shaped structure, and in which the front jaw portions and the rear handle portions of the first and second elongated members are spaced apart from each other, to a closed position in which the front jaw portions and the rear handle portions of the first and second elongated members are adjacent to each other.

The rear handle portion of each of the first and second elongated members has an inner longitudinal edge formed with a wire stripping section. The wire stripping section of the first elongated member has an upwardly inclined bottom face and a top face formed with a wire stripping teethed edge. The wire stripping section of the second elongated member has a downwardly inclined top face and a bottom face formed with a wire stripping teethed edge. The top face of the wire stripping section of the first elongated member is in sliding contact with the bottom face of the wire stripping section of the second elongated member when the first and second elongated members are moved to the closed position so as to strip an insulation layer of an electrical wire placed between the wire stripping sections of the first and second elongated members.

The inner longitudinal edge of each of the first and second elongated members is further formed with a lobe member. The lobe member of the first elongated member has a downwardly inclined top face, while the lobe member of the second elongated member has an upwardly inclined bottom face. The top face of the lobe member of the first elongated member is in sliding contact with the bottom face of the lobe member of the second elongated member to prevent movement of the first and second elongated members away from each other in a direction parallel to an axis of the fastener when the first and second elongated members are moved to the closed position.

BRIEF DESCRIPTION OF THE DRAWINGS

Other features and advantages of the present invention will become apparent in the following detailed description of the preferred embodiment with reference to the accompanying drawings, of which.

DESCRIPTION OF THE PREFERRED EMBODIMENT

Figure 1:
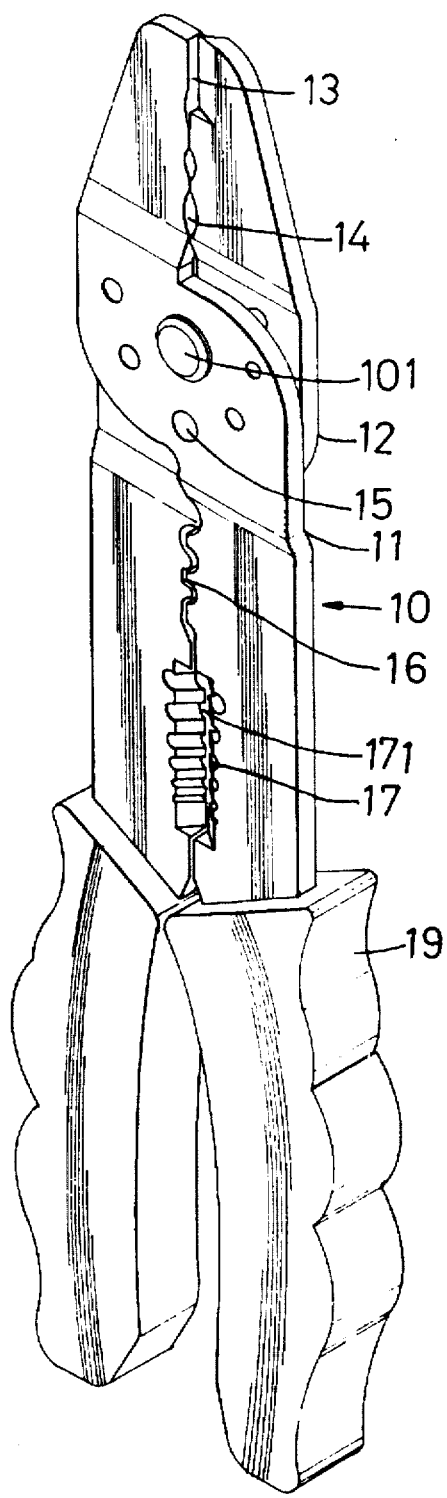
FIG. 1 is a perspective view illustrating a conventional crimping tool.
Figure 2:
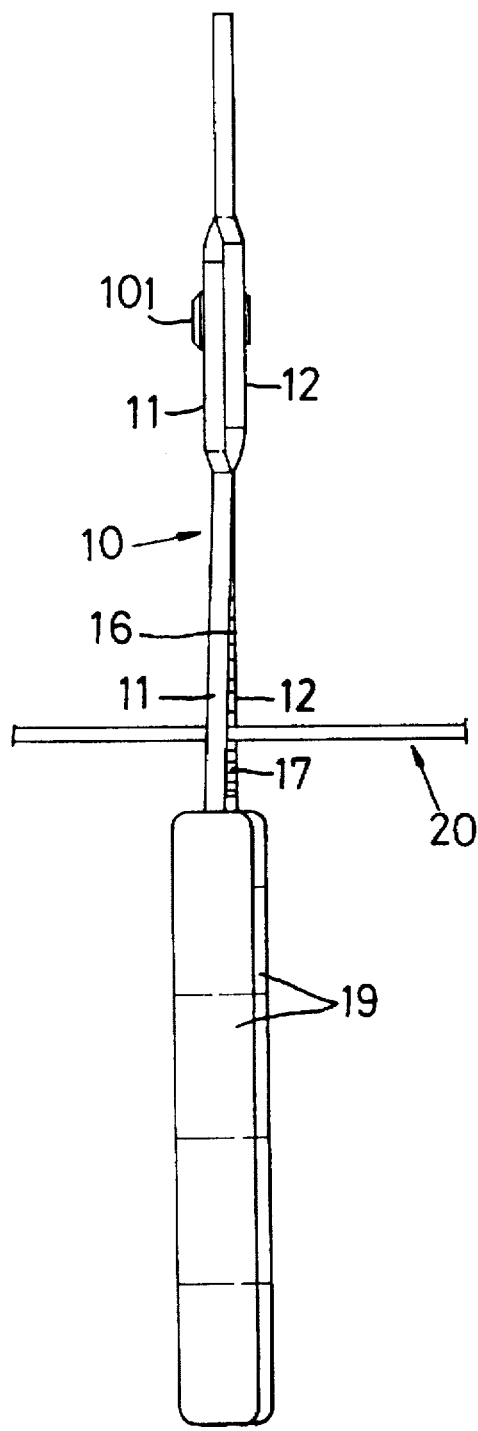
FIG. 2 is a cross-sectional view illustrating how torsion generally occurs in the conventional crimping tool.
Figure 3:
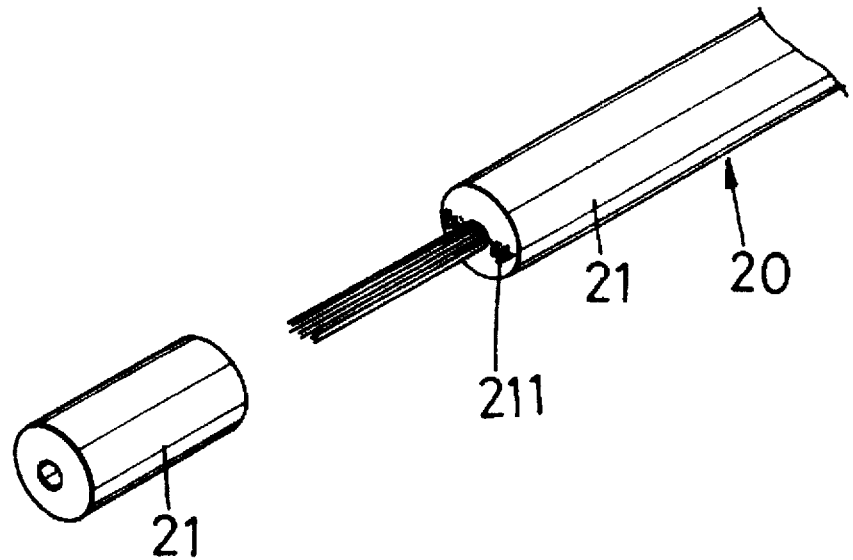
FIG. 3 is an illustration of an electrical wire after the insulation layer thereof has been stripped with the use of the conventional crimping tool of FIG. 1.
Figure 4:
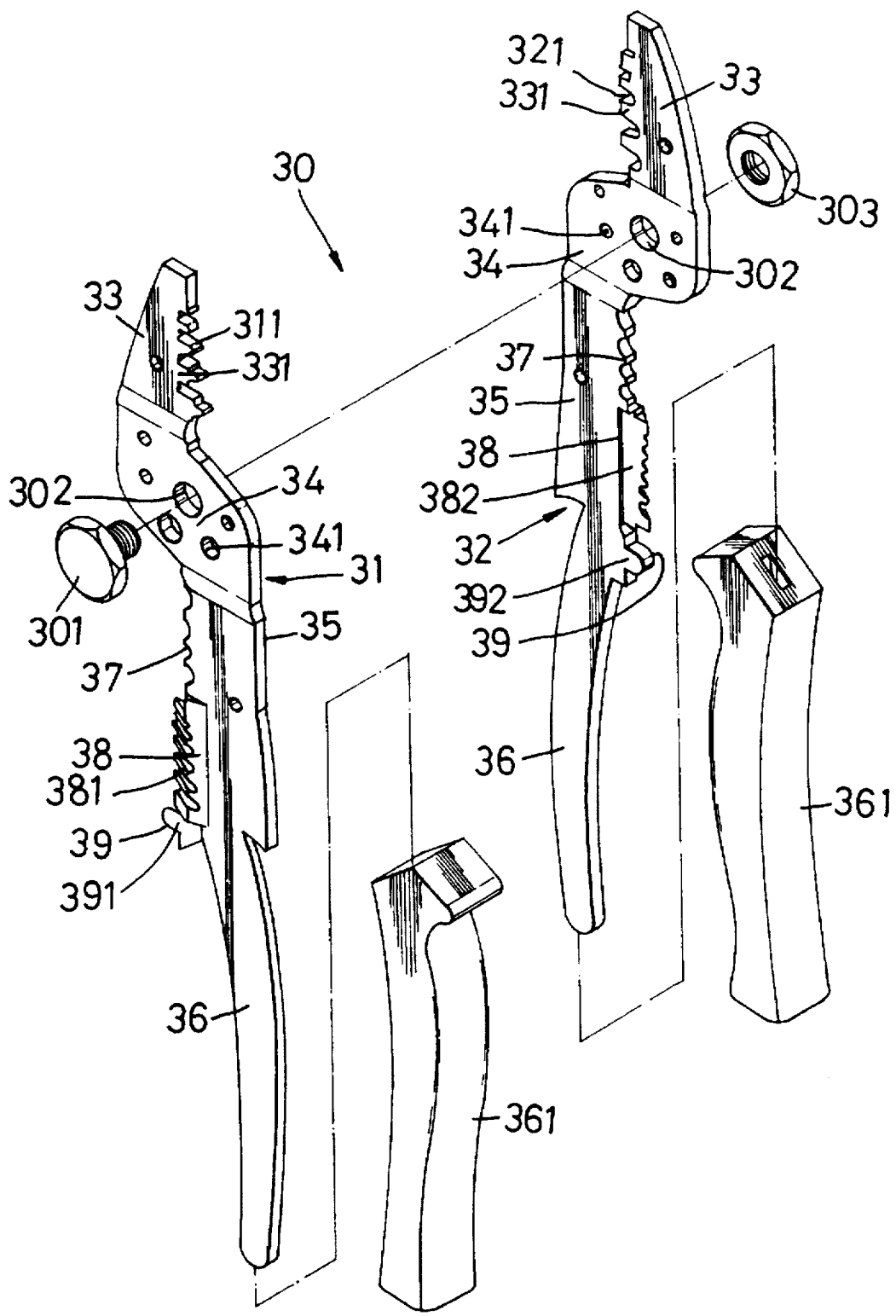
FIG. 4 is an exploded perspective view of a preferred embodiment of the crimping tool according to the present invention.

Referring to FIG. 4, the preferred embodiment of a crimping tool 30 according to the present invention is shown to include a first elongated member 31 and a second elongated member 32. Each of the first and second elongated members 31, 32 has a front jaw portion 33, a middle pivot portion 34 and a rear handle portion 35. The crimping tool 30 further includes a fastener, such as a pivot member 301, which extends through a pivot hole 302 in the middle pivot portions 34 and which cooperates with a nut 303 to mount pivotally the first and second elongated members 31, 32 to each other in such a manner that the first and second elongated members 31, 32 are movable pivotally towards each other from an open position in which the first and second elongated members 31, 32 form a generally X-shaped structure, and in which the front jaw portions 33 and the rear handle portions 35 of the first and second elongated members 31, 32 are spaced apart from each other, to a closed position in which the front jaw portions 33 and the rear handle portions 35 of the first and second elongated members 31, 32 are adjacent to each other.

The front jaw portion 33 of each of the first and second elongated members 31, 32 has an inner longitudinal edge formed with a first wire crimping section 331 which is provided with a plurality of teeth 311 and indentions 321 that engage each other. The middle pivot portion 34 of each of the first and second elongated members 31, 32 is formed with screw cutting holes 341 of different dimensions around the pivot hole 302. The screw cutting holes 341 in the first elongated member 31 can be respectively registered with the screw cutting holes 341 in the second elongated member 32. A screw (not shown) can be extended through selected registered ones of the screw cutting holes 341 and is cut when the crimping tool 30 is operated. The rear handle portion 35 of each of the first and second elongated members 31, 32 has an inner longitudinal edge formed with a second wire crimping section 37 and a wire stripping section 38. The rear handle portion 35 of each of the first and second elongated members 31, 32 has a rearmost portion 36 with a hollow grip member 361 sleeved thereon.

Figure 5:
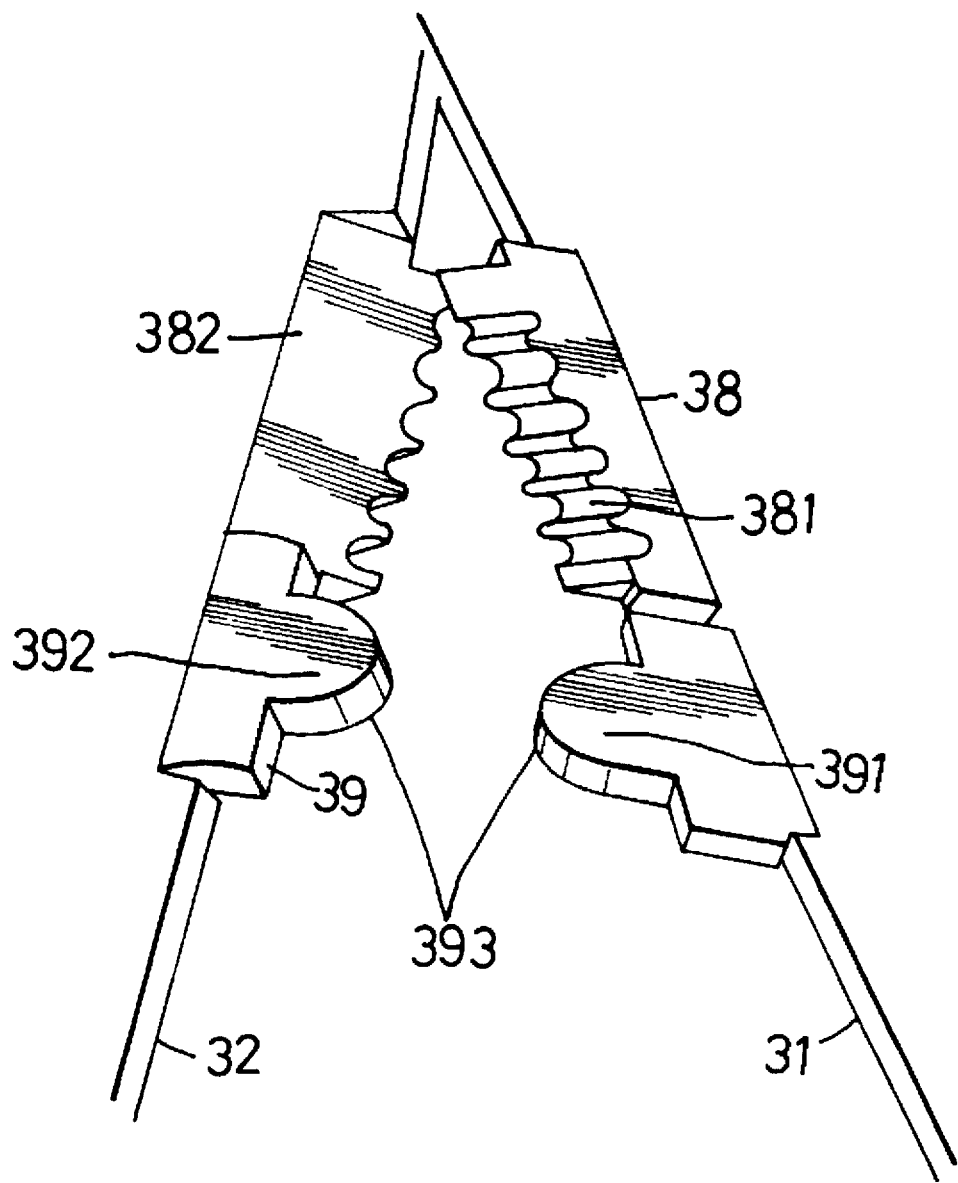
FIG. 5 is an illustration of the wire stripping sections and the lobe members of the crimping tool of FIG. 4.

Referring to FIG. 5, in conjunction with FIG. 4, the wire stripping section 38 of the first elongated member 31 has a top face 381 formed with a wire stripping teethed edge. The wire stripping section 38 of the second elongated member 32 has a downwardly inclined top face 382. Each of the wire stripping sections 38 of the first and second elongated members 31, 32 has a predetermined width. The wire stripping section 38 of the first elongated member 31 has a generally upwardly inclined orientation. The wire stripping section 38 of the second elongated member 32 has a generally downwardly inclined orientation. Lobe members 39 are respectively formed adjacent to the wire stripping sections 38. Each of the lobe members 39 has a curving edge 393. The lobe member 39 of the first elongated member 31 has a top face 391 and a generally downwardly inclined orientation that is opposite to the orientation of the adjacent wire stripping section 38. The lobe member 39 of the second elongated member 32 has a top face 392 and a generally upwardly inclined orientation that is opposite to the orientation of the adjacent wire stripping section 38.

Figure 6:
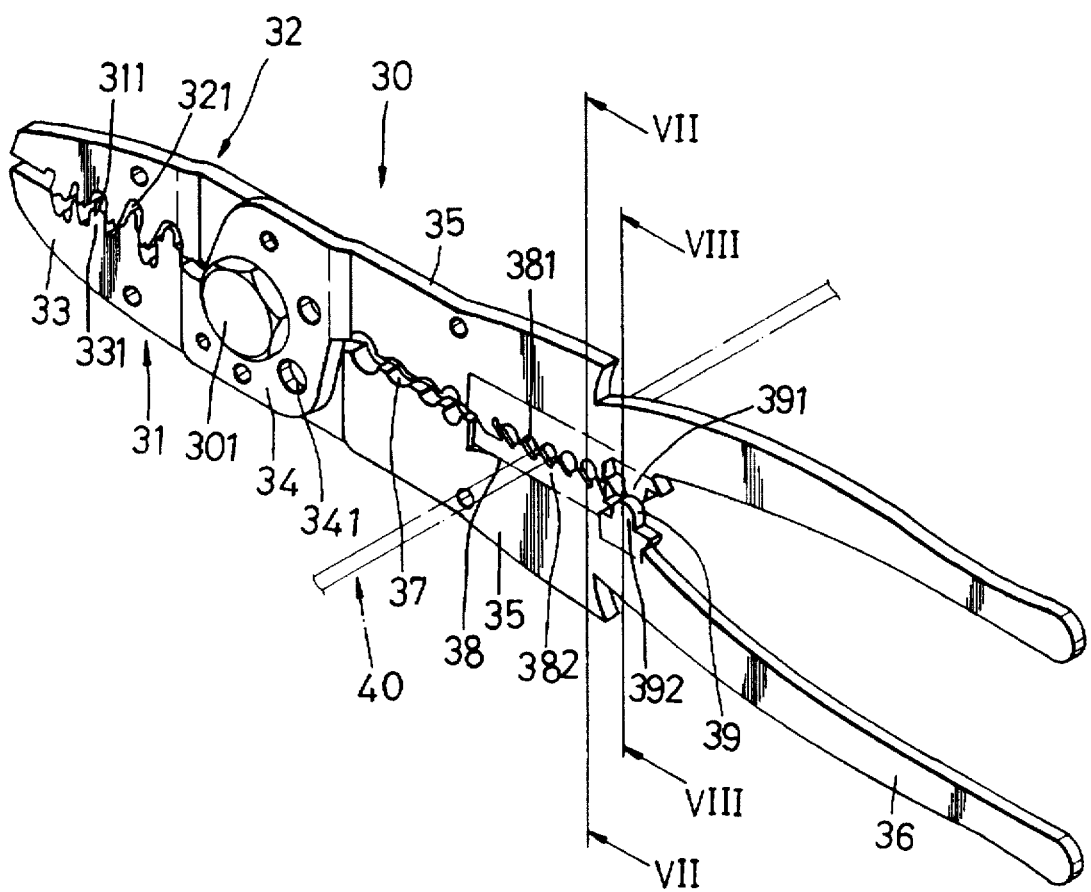
FIG. 6 is an illustration of the crimping tool of FIG. 4 when the first and second elongated members are in the closed position, in which grip members have not been assembled onto the crimping tool.

As shown in FIG. 6, when an electrical wire 40 is placed between the wire stripping sections 38 of the first and second elongated members 31, 32, and the first and second elongated members 31, 32 are operated to move the same to the closed position, the wire stripping sections 38 and the lobe members 39 of the first and second elongated members 31, 32 crossly engage each other. In this situation, the lobe members 39 cooperatively prevent the first and second elongated members 31, 32 from moving away from each other in a direction parallel to an axis of the pivot member 301.

Figure 7:
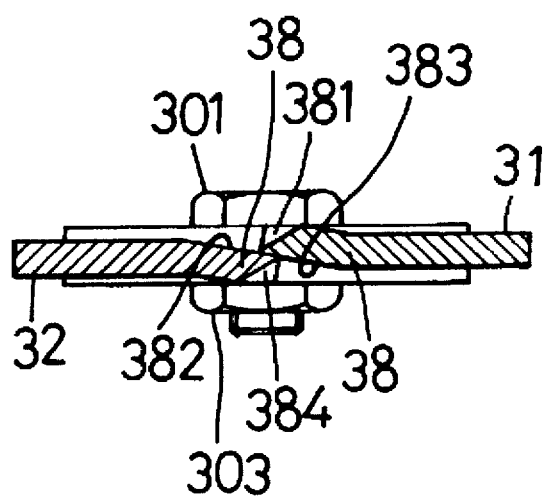
FIG. 7 is a cross-sectional view of the preferred embodiment, taken along line VII—VII in FIG. 6.

Specifically, referring to FIG. 7, the wire stripping section 38 of the first elongated member 31 has an upwardly inclined bottom face 383 and a top face 381 formed with a wire stripping teethed edge. The wire stripping section 38 of the second elongated member 32 has a downwardly inclined top face 382 and a bottom face 384 formed with a wire stripping teethed edge. The bottom face 383 of the wire stripping section 38 of the first elongated member 31 is in sliding contact with the top face 382 of the wire stripping section 38 of the second elongated member 32 when the first and second elongated members 31, 32 are moved to the closed position.

Figure 8:
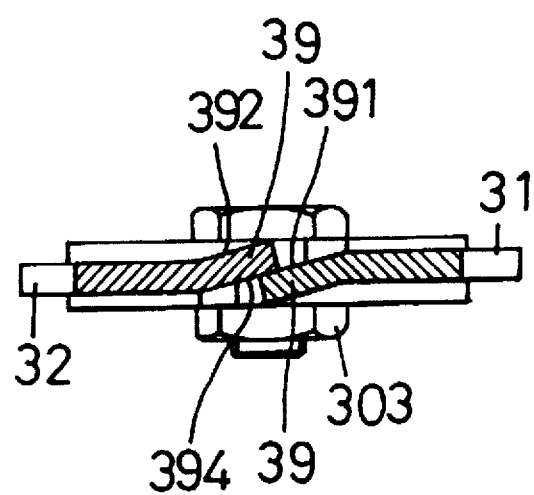
FIG. 8 is a cross-sectional view of the preferred embodiment, taken along line VIII—VIII in FIG. 6.

Referring to FIG. 8, the lobe member 39 of the first elongated member 31 has a downwardly inclined top face 391. The lobe member 39 of the second elongated member 32 has an upwardly inclined bottom face 394. The top face 391 of the lobe member 39 of the first elongated member 31 is in sliding contact with the bottom face 394 of the lobe member 39 of the second elongated member 32.

Figure 9:
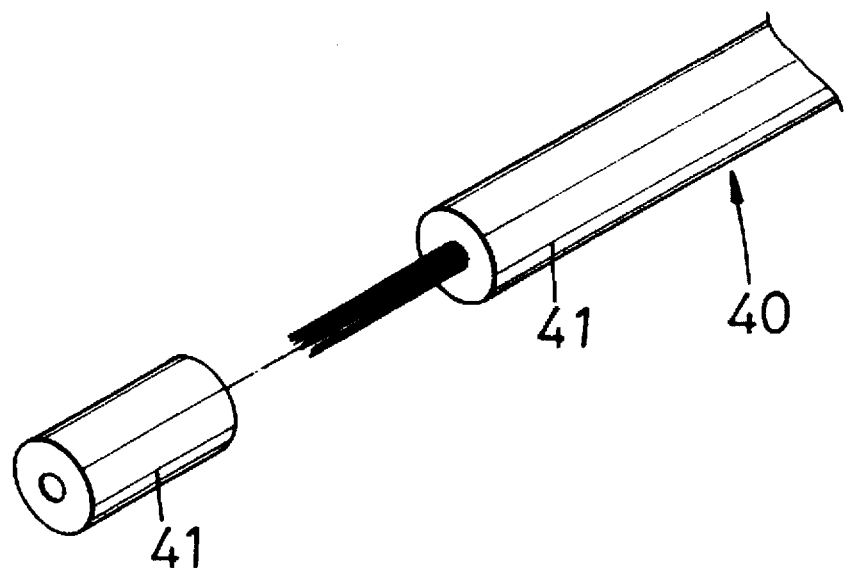
FIG. 9 is an illustration of an electrical wire after the insulation layer thereof has been stripped with the use of the crimping tool of the present invention.

As shown in FIG. 9, the insulation layer 41 of the electrical wire 40 is perfectly stripped by the crimping tool 30 of the present invention and no residual bits are left.

Therefore, by using the crimping tool 30 of the present invention, torsion that generally occurs between the first and second elongated members of the conventional crimping tool is avoided. The crimping tool is therefore safe to use, and the insulation layer of an electrical wire can be perfectly stripped, thereby resulting in increased working efficiency. Moreover, each of the first and second elongated members of the crimping tool of the present invention can be integrally formed. Thus, the manufacturing thereof is simplified.

With this invention thus explained, it is apparent that numerous modifications and variations can be made without departing from the scope and spirit of this invention. It is therefore intended that this invention be limited only as indicated in the appended claims.

I claim:

1. A crimping tool comprising a first elongated member and a second elongated member, each of said first and second elongated members having a front jaw portion, a middle pivot portion and a rear handle portion, said crimping tools further comprising a fastener which extends through said middle pivot portions to pivotally mount said first and second elongated members to each other in such a manner that said first and second elongated members are pivotally movable towards each other from an open position in which said first and second elongated members form a generally X-shaped structure, and in which said front jaw portions and said rear handle portions of said first and second elongated members are spaced apart from each other, to a closed position in which said front jaw portions and said rear handle portions of said first and second elongated members are adjacent to each other, wherein:

said rear handle portion of each of said first and second elongated members has an inner longitudinal edge formed with a wire stripping section, said wire stripping section of said first elongated member having a bottom face and a top face formed with a wire stripping teethed edge, said wire stripping section of said second elongated member having a top face and a bottom face formed with a wire stripping teethed edge, said bottom face of said stripping section of said first elongated member being in sliding contact with said top face of said stripping section of said second elongated member when said first and second elongated members are moved to said closed position so as to strip an insulation layer of an electrical wire placed between said wire stripping sections of said first and second elongated members; and said inner longitudinal edge of each of said first and second elongated member is further provided with a lobe member, said lobe member of said first elongated member having a top face, said lobe member of said second elongated member having a bottom face, and said top face of said lobe member of said first elongated member being in sliding contact with said bottom face of said lobe member of said second elongated member to prevent movement of said first and second elongated members away from each other in a direction parallel to an axis of said fastener when said first and second elongated members are moved to said closed position.

* * * * *